United States Patent
Völker et al.

(10) Patent No.: US 11,885,379 B2
(45) Date of Patent: Jan. 30, 2024

(54) DEVICE FOR CONNECTING A TOOTHING PART TO A SHAFT FOR CONJOINT ROTATION WITH THE LATTER, METHOD FOR PRODUCING SUCH A DEVICE, AND ANGULAR GEAR

(71) Applicant: WITTENSTEIN SE, Igersheim (DE)

(72) Inventors: Klaus Völker, Igersheim (DE); Philipp Farrenkopf, Würzburg (DE); Florian Schmidt, Ahorn-Schillingstadt (DE)

(73) Assignee: WITTENSTEIN SE, Igersheim (DE)

( * ) Notice: Subject to any disclaimer, the term of this patent is extended or adjusted under 35 U.S.C. 154(b) by 543 days.

(21) Appl. No.: 16/690,325

(22) Filed: Nov. 21, 2019

(65) Prior Publication Data
US 2020/0158182 A1    May 21, 2020

(30) Foreign Application Priority Data
Nov. 21, 2018  (DE) .......................... 102018129339.9

(51) Int. Cl.
*F16D 1/072* (2006.01)
*F16B 17/00* (2006.01)

(52) U.S. Cl.
CPC .............. *F16D 1/072* (2013.01); *F16B 17/00* (2013.01); *Y10T 403/4958* (2015.01); *Y10T 403/4966* (2015.01)

(58) Field of Classification Search
CPC ........ F16D 1/072; F16D 1/0852; F16D 1/087; F16D 1/064; F16D 1/027; F16D 1/0858; Y10T 403/4958; Y10T 403/4966; Y10T 403/4916; Y10T 403/4949; F16B 17/00; F16B 17/004; F16B 4/00; F16B 4/004; F16B 11/002; F16C 2226/12
USPC .................................. 403/276, 280, 281, 282
See application file for complete search history.

(56) References Cited

U.S. PATENT DOCUMENTS

| | | | | |
|---|---|---|---|---|
| 2,279,955 A | * | 4/1942 | Sipe ........................ | F16D 1/072 |
| | | | | 403/281 |
| 4,006,993 A | * | 2/1977 | Woerlee ..................... | F16D 1/06 |
| | | | | 403/359.5 |
| 4,010,533 A | * | 3/1977 | Pitner ...................... | F16D 1/072 |
| | | | | 403/281 |

(Continued)

FOREIGN PATENT DOCUMENTS

| | | | | |
|---|---|---|---|---|
| DE | 2808696 A1 | * | 3/1978 | .............. B23P 11/00 |
| DE | 2808696 A1 | | 9/1979 | |

(Continued)

OTHER PUBLICATIONS

Norm DIN 5402-1 2014-05-00. Walzlager—Walzlagerteile—Teil 1: Zylinderrollen. 10, pp. 1-15, May 2014.

*Primary Examiner* — Josh Skroupa
(74) *Attorney, Agent, or Firm* — Bachman & LaPointe, P.C.

(57) ABSTRACT

A device (1) for connecting a toothing part (3) to a shaft (5) for conjoint rotation with the latter, having a toothing part (3) with a circular bore, a shaft (5) which has: a cylindrical receiving portion (4) for receiving the toothing part (3), and a cylindrical recess (8) in the shaft (5), which cylindrical recess (8) extends at least substantially over the entire length of the receiving portion (4), and a press-in cylinder (10) which can be pressed into the recess (8) and which has an oversize in relation to the recess (8).

20 Claims, 2 Drawing Sheets

(56) References Cited

U.S. PATENT DOCUMENTS

| | | | | |
|---|---|---|---|---|
| 5,259,689 A * | 11/1993 | Arand | ............... | F16B 21/065 403/337 |
| 6,375,381 B1 * | 4/2002 | Ruschke | ............ | F16D 1/072 403/282 |
| 6,803,695 B2 * | 10/2004 | Yamamoto | ............ | H02K 1/30 29/598 |
| 6,851,860 B2 * | 2/2005 | Oelsch | ............ | F16D 1/072 384/107 |
| 7,155,824 B2 * | 1/2007 | Prucher | ............ | F16D 1/068 29/893.3 |
| 8,910,365 B2 * | 12/2014 | Walser | ............ | F16D 1/072 464/183 |
| 11,174,900 B2 * | 11/2021 | Post | ............ | F16H 55/52 |
| 2005/0255960 A1 * | 11/2005 | Maruyama | ............ | F16H 55/17 475/331 |
| 2018/0094658 A1 * | 4/2018 | Mitsch | ............ | F16D 1/0805 |
| 2019/0048938 A1 * | 2/2019 | Demtröder | ............ | F03D 9/25 |

FOREIGN PATENT DOCUMENTS

| | | | | |
|---|---|---|---|---|
| DE | 3543672 A1 * | 12/1985 | ............ | B04B 9/08 |
| DE | 10160246 C1 * | 4/2003 | ............ | F16D 1/072 |
| DE | 112005000616 T5 | 2/2007 | | |
| DE | 102011053646 A1 * | 3/2013 | ............ | F16D 1/06 |
| DE | 102012223883 A1 * | 6/2014 | ............ | B23P 11/00 |
| DE | 102016208762 A1 * | 11/2017 | | |
| DE | 102017101345 A1 * | 7/2018 | ............ | B04B 9/08 |
| EP | 0987081 A1 * | 3/2000 | ............ | F16D 1/072 |
| GB | 274954 A * | 7/1927 | ............ | F16D 1/072 |
| WO | WO-2017050805 A1 * | 3/2017 | ............ | F16D 1/06 |

\* cited by examiner

DEVICE FOR CONNECTING A TOOTHING PART TO A SHAFT FOR CONJOINT ROTATION WITH THE LATTER, METHOD FOR PRODUCING SUCH A DEVICE, AND ANGULAR GEAR

BACKGROUND OF THE INVENTION

The invention relates to a device for connecting a toothing part to a shaft for conjoint rotation with the latter, and a method for producing such a device. The invention further relates to an angular gear.

To connect shafts to hubs, in particular of angular gears, various solutions are known from the prior art, for example a knurled connection, a shrink-fit connection or a longitudinal interference fit.

In the case of a knurled connection, the manufacturing process involves knurling, which can be complicated. In the case of a shrink-fit connection, structural parts have to be heated and cooled during the assembly process. The required heat input can have an influence on a heat-treated structure of the material, particularly if considerable temperature differences are required for assembly. In the case of an interference fit, high joining forces or high settling rates can occur, and there is in principle the danger of seizing in the join.

SUMMARY OF THE INVENTION

The object of the invention is to make available an improved device for connecting a toothing part to a shaft for conjoint rotation with the latter, an improved or easier to produce angular gear, and an improved method for production of such a device. In particular, the aim is, for example, to make assembly easier, to ensure a reliable connection or to avoid heat treatment or the use of excessive forces for pushing the toothing part onto the shaft.

A first aspect of typical embodiments concerns a device for connecting a toothing part to a shaft for conjoint rotation with the latter, having: a toothing part with a circular bore, and a shaft which in turn has: a cylindrical receiving portion for receiving the toothing part, and a cylindrical recess in the shaft, which cylindrical recess extends at least substantially over the entire length of the receiving portion, and a press-in cylinder which can be pressed into the recess and which has an oversize in relation to the recess.

A further aspect of typical embodiments concerns a method for producing a device in one of the typical embodiments described herein, in which method the toothing part is pushed onto the receiving portion of the shaft, and the press-in cylinder is pressed into the recess of the shaft.

A further aspect concerns an angular gear with a device in one of the typical embodiments described herein, in particular with a bevel gear as the toothing part or a hollow shaft as the shaft. Typical angular gears comprise a second device, wherein a second bevel gear is provided as toothing part on a second shaft, and wherein the second bevel gear meshes with the first bevel gear. In this way, an angular gear can be made available that can be produced quickly and easily.

Typical embodiments have, in the toothing part or the receiving portion, a roughness depth of less than 5 μm or less than 1 μm. Typical roughness values of the internal diameter of the toothing part or of the surface of the receiving portion are at most 0.5 μm or at most 0.2 μm or at most 0.16 μm.

The recess in the shaft can have roughness values of up to 20 μm or up to 10 μm. Typical roughness values of the surface of the press-in cylinder are at most 0.2 μm or at most 0.16 μm.

The bore in the toothing part can be a through-bore or a blind bore. The cylindrical receiving portion typically has a tooth-free, smooth or roller-burnished surface. In typical embodiments, the cylindrical recess is arranged centrally in the shaft and oriented concentrically or axially. The expression "at least substantially over the entire length" means that the length of the recess measures typically at least 70% or at least 90% of the length of the receiving portion or exactly or at least the entire length of the receiving portion. The recess in the shaft is typically configured as a through-bore.

Advantages of typical embodiments can include comparatively simple assembly in particular of the toothing part on the receiving portion, since the shaft in the region of the receiving portion has a comparatively low stiffness when the press-in cylinder is not yet pressed in. Once the press-in cylinder is pressed in, the stress in the joint between receiving portion and toothing part increases such that, despite the low force applied when pushing the toothing part on, comparatively high torques can be transmitted via the joint. Further advantages can include a comparatively simple preliminary machining or a high quality of concentric running of the joined parts. In typical embodiments, easy and quick assembly is possible without heating and cooling of structural parts, while in some embodiments heating or cooling can additionally take place.

Typical embodiments afford a combination of the advantages of a longitudinal interference fit and of a transverse interference fit. The longitudinal interference fit can be produced with cleaned surfaces and thus with a high coefficient of friction, without the danger of seizing. The press-in cylinder can also be joined with a lower coefficient of friction, since it only generates the oversize and does not lie in the torque flow. Through the separation into two joints, namely a first joint for torque transmission between receiving portion and toothing part and a second joint for generating the critical part of the oversize, advantages can be afforded for example in the manufacturing process, and a high torque can be transmitted.

In typical methods, the toothing part is pushed onto the receiving portion by pressing. The joint parts are typically degreased or cleaned before the pressing-on, in order to achieve high friction values.

In typical devices, the wall thickness of the shaft in the region of the receiving portion is less than 30%, less than 20% or in particular less than 15% of the external diameter of the receiving portion. In this way, it is possible to achieve simple pushing-on or pressing-on of the toothing part.

Typically, the toothing part is a bevel gear or a spur gear. In typical embodiments, the shaft is a drive shaft or a driven shaft of a gear mechanism, for example of an angular gear or of a spur gear, in particular a planetary gear. In the case of angular gears, the invention affords the advantage of simple assembly.

In typical devices, an interference fit is present between the external diameter of the receiving portion and the internal diameter of the bore of the toothing part. Typically, the external diameter of the receiving portion and the internal diameter of the bore of the toothing part are chosen such that, in the joint between these parts, there is an oversize of at least 0.0001 times or at least 0.0005 times or of at most 0.003 times or at most 0.05 times the internal diameter of the bore.

In typical devices, an interference fit is present between the internal diameter of the recess in the shaft and the external diameter of the bolt. Typically, the internal diameter of the recess in the shaft and the external diameter of the bolt are chosen such that, in the joint between these parts, after assembly of the toothing part, there is an oversize of at least 0.0003 times or at least 0.0005 times or of at most 0.005 times or at most 0.01 times the internal diameter of the recess in the shaft.

Prior to the assembly of the toothing part, the oversize between these parts is at least 0.0001 times or at least 0.0005 times or at most 0.03 times or at most 0.005 times the internal diameter of the recess of the shaft.

In typical devices, a connection that is free of form-fit engagement at least in the circumferential direction is present between the toothing part and the receiving portion or the shaft. Typically, a connection that is free of form-fit engagement at least in the circumferential direction is present between the press-in cylinder and the recess of the shaft. "Free of form-fit engagement" typically means that there are no teeth, corrugations or similar structures that permit form-fit engagement. In some embodiments, but not all, "free of form-fit engagement" also includes grooves, wherein the mating piece has no corresponding structures for form-fit engagement. Assembly is made easier in this way, since the assembly can take place independently of the angle position.

Typically, the wall thickness of the shaft in the region of the receiving portion is at most 5 mm or at most 3 mm or at most 2.5 mm or in particular at most 2 mm. In typical embodiments, the maximum wall thickness is 1.5 mm for external diameters of the shaft of 20 mm, or less than or at most 2 mm for external diameters of the shaft of 45 mm or less. In typical devices, the wall thickness of the shaft in the region of the receiving portion is greater than 3% of the external diameter of the receiving portion. Typically, the wall thickness is at most 10% of the external diameter or at most 15% of the external diameter of the shaft.

Small wall thicknesses, on account of the elastic resilience of the shaft thereby created, allow the toothing part to be pressed on with a comparatively low pressing-in force, at the same time with low settling rates and a considerable increase of the stress in the joint by pressing-in of the press-in cylinder. However, for (preliminary) fixing of the toothing part before the press-in cylinder is pressed in, there should be a certain minimum stress in the joint in order to prevent slipping or a change of position of the toothing part during the assembly.

In a typical device, the press-in cylinder is produced as a roller body of a roller bearing. Typically, the roller body is a roller body of a cylindrical roller bearing. Typically, use is made of roller bodies according to DIN 5402-1, which have a very good surface quality with low roughness values, a high degree of material strength, a high degree of dimensional stability and a suitable ratio of diameter to length. This permits a compact format and can help to avoid seizing during the pressing-in or to effect a slight variation in the joint compression.

Typically, the recess has a contact region which extends at least substantially over the length of the receiving portion and, at least at one end of the contact region, is rotated freely with a free rotation diameter which is greater than the diameter of the press-in cylinder. Typically, the contact region extends over the length of the receiving portion. In typical embodiments, in the region of the receiving portion, there is an interference fit between the receiving portion and the toothing part. In this way, it is possible for the toothing part to be fixed in a defined region.

In typical embodiments, the length of the press-in cylinder corresponds at least to the length of the contact region. Typically, the length of the press-in cylinder corresponds at least substantially to the total length of the bore of the toothing part or at least to the length of the contact region of the receiving portion.

Generally, embodiments of the invention can afford the following advantages among others: advantageous structural parts, simple geometry, quick and easy and reliable assembly, a high load-bearing capacity, and also a high quality of concentric running. Particularly in angular gears, the invention leads to a simple wheel geometry of the bevel gear, which can be advantageous for example for the hardening process of the structural part.

BRIEF DESCRIPTION OF THE DRAWINGS

Illustrative embodiments of the invention are explained in more detail below with reference to drawings, in which.

DETAILED DESCRIPTION

Typical illustrative embodiments of the invention are described below, wherein the same reference signs are used for identical or similar parts and are not explained again in the context of each figure. The invention is not limited to the typical embodiments described below.

Figure 1:
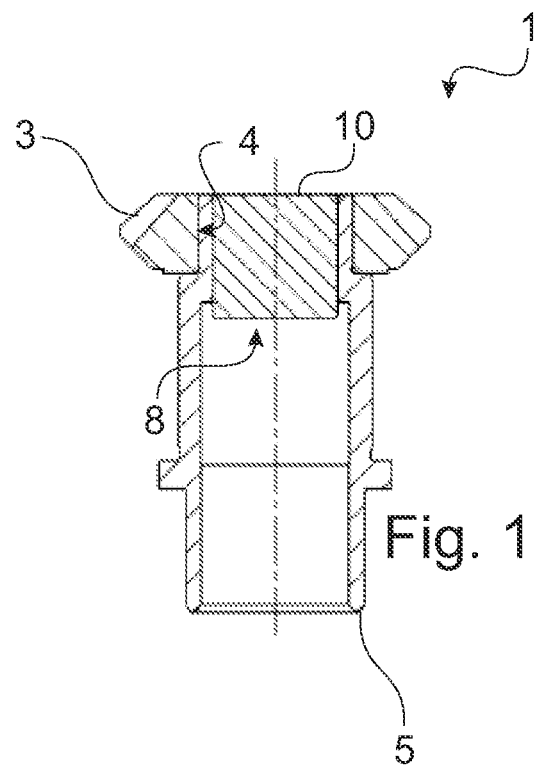
FIG. 1 shows a schematic sectional view of a typical embodiment of a device.

FIG. 1 shows a typical embodiment of a device 1 in a schematic longitudinal section. A toothing part 3, being a hub configured as a bevel gear in the illustrative embodiment shown and having a circular bore, has been pressed with an oversize of H6/p6 onto a receiving portion 4 of a shaft 5 with a slight pressing force. The oversize relates here to the internal diameter of the circular bore of the toothing part 3 in relation to the external diameter of the receiving portion 4.

Where reference is made herein to the internal diameter or the inner face of the toothing part, this generally means the internal diameter of the circular bore of the toothing part.

The receiving portion 4 or an inner face of the toothing part 3 has a high surface quality with a roughness depth of less than 1 μm.

The receiving portion and the inner face of the toothing part preferably both have a roughness depth of less than 1 μm. In typical embodiments, the receiving portion of the shaft has, for manufacturing reasons, a roughness depth of more than 1 μm, for example at least 3 μm or less than 10 μm. A typical example can be a receiving portion of the shaft with a roughness depth of 4 μm. Both of said surfaces, the receiving portion and the inner face of the toothing part, typically have no structures, or they are to be designated as entirely cylindrical.

Moreover, the receiving portion 4 and the inner face 6 have been cleaned prior to assembly. In this way, high friction values for torque transmission can be achieved.

In typical embodiments, an inner face of the toothing part or the receiving portion are cleaned prior to assembly. For this purpose, solvent-based or water-based cleaners are used as cleaning agents.

The shaft 5 has a recess 8 configured as a through-bore. A press-in cylinder 10 is pressed into the recess 8. In the illustrative embodiment, the press-in cylinder 10 is a roller body of a cylindrical roller bearing which, in relation to the recess 8, has an oversize of 0.001 times the diameter of the press-in cylinder 10. Before being pressed in, the press-in cylinder 10 is wetted with a preservative or with an oil or grease.

In typical embodiments, before the press-in cylinder is pressed in, the press-in cylinder or the inner face of the recess is wetted with an oil, a grease or with a preservative. Typical means for doing this are: the lubricating grease Tribol GR 100-1 PD or the anti-corrosion agent Branotect. In this way, the pressing-in force can be reduced. In further embodiments, the press-in cylinder is pressed in without prior treatment with an oil, such that one work step is omitted.

By using a roller body as press-in cylinder, a part is used which is available as a standard part with high strength, high surface quality and low diameter tolerance. In further embodiments, specially produced bolts are used as press-in cylinder.

Through the action of the pressed-in press-in cylinder 10 in the recess 8, a widening of the shaft 5 in the region of the recess 8 is achieved, such that a pressing effect in the joint between shaft 5 and toothing part 3 is heightened and the torque that can be transmitted is increased.

Figure 2:
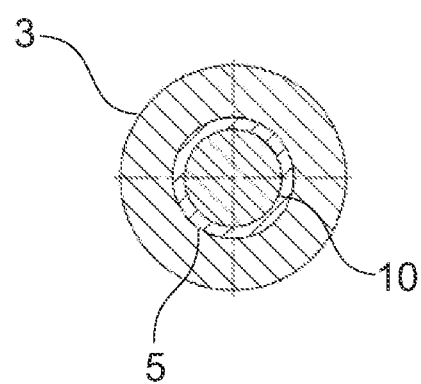
FIG. 2 shows a further sectional view through the embodiment of FIG. 1.

For illustrative purposes, FIG. 2 shows a schematic cross section through the embodiment of FIG. 1 at the level of the toothing part 3.

Figure 3:
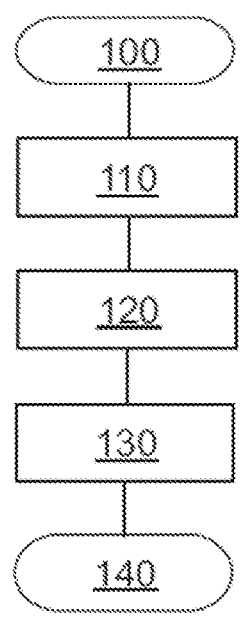
FIG. 3 shows a schematic sequence of a typical embodiment of a method.
Figure 4:
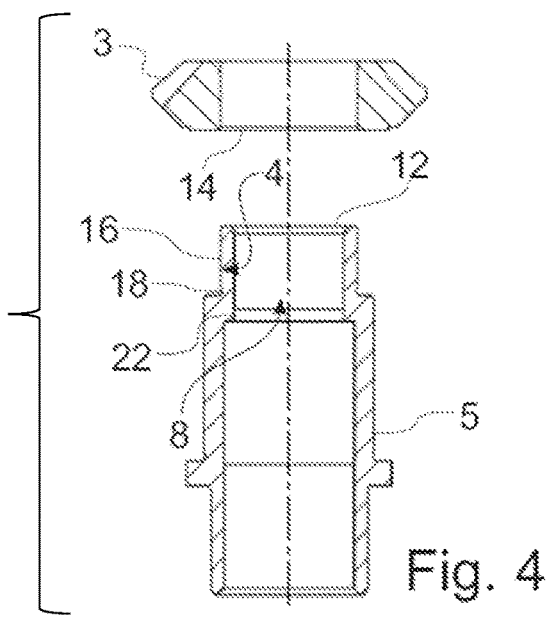
FIG. 4 shows a state while carrying out the method of FIG. 3.
Figure 5:
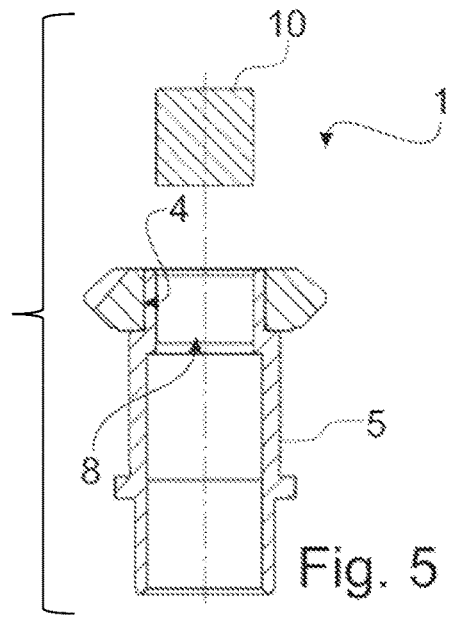
FIG. 5 shows a further state while carrying out the method of FIG. 3.

FIG. 3 shows the sequence of a typical method for producing the typical device as shown in FIG. 1 and FIG. 2. FIG. 4 and FIG. 5 show states of the device during the production and are explained in connection with FIG. 3, with reference also being made to the reference signs and the explanations for the corresponding parts of FIG. 1 and FIG. 2. In particular, the reference signs in FIG. 4 and FIG. 5 are not all explained again and, in order to make matters clearer, not all the reference signs are shown in the two figures.

The method commences in a block 100. In a block 110, the toothing part 3 and the shaft 5 are made available. This state is also shown schematically in a longitudinal section in FIG. 4.

In the block 120, the toothing part 3 is pushed onto the receiving portion 4 of the shaft 5. A relatively low force is needed for this, since the shaft 5 in the region of the receiving portion 4 has a small wall thickness and thus low stiffness; the shaft 5 therefore yields and thus, despite the oversize of the toothing part 3, allows easy pushing onto the shaft 5. Through the pressing of the toothing part 3 onto the thin-walled receiving portion 4 of the shaft 5, a large part of the oversize goes into a diameter reduction of the recess 8, such that the oversize is increased from the press-in cylinder to the recess 8 after the pressing-on.

The shaft 5 and the toothing part 3 are shown in the assembled state in the lower part of FIG. 5. Moreover, in FIG. 5, the press-in cylinder 10 made available for the block 130 is shown in the upper part of FIG. 5.

In the block 130, the press-in cylinder 10 is pressed into the recess 8 of the shaft 5. The pressing-in can be made easier by wetting with oil. It should be noted that only compressive stresses have to be transmitted between the press-in cylinder 10 and the shaft 5, not a torque. Therefore, no shear stresses have to be transmitted in the joint between press-in cylinder 10 and recess 8 of the shaft 5, such that low friction between press-in cylinder 10 and shaft 5 affords advantages during assembly but no disadvantages during operation.

The method concludes in block 140.

FIG. 4 reveals in particular a number of details that are not shown quite as clearly or at all in the other figures. These details are now explained below as typical features of illustrative embodiments, although not all embodiments need to have these features.

In typical embodiments, a chamfer for facilitated pressing-in of the press-in cylinder can be provided at the opening of the receiving portion of the shaft; see the chamfer 12 on the receiving portion 8 in FIG. 4. In typical embodiments, the press-in cylinder has a chamfer.

To make the toothing part easier to push on, the toothing part or the shaft can have a chamfer at the outer circumference. In the typical illustrative embodiment of FIG. 4, the toothing part 3 has a chamfer 14.

Moreover, a contact region 16, which has a greater diameter than at least one adjoining groove 18, is formed on the receiving portion 4 of the embodiment of FIG. 4. With respect to the end of the shaft 5 onto which the toothing part 3 is pushed, the groove 18 lies at the remote end of the receiving portion 4. In this way, the joint between the receiving portion 4 and thus the contact region 16 of the receiving portion 8, on the one hand, and the inner face of the circular bore of the toothing part 3 is exactly defined, such that concentric running properties can be improved still further.

Moreover, in typical embodiments, the effective length of the contact between the press-in cylinder 10 and the shaft 5 is defined by the fact that, inside the recess, a central region is defined which is adjoined by a free rotation diameter 22. The central region is thus defined between the chamfer 12 of the shaft 5 and the free rotation diameter 22 and has at least the width of the toothing part 3 or the width of the contact region 16 of the receiving portion 8. Thus, at each location where the circular bore of the toothing part 3 is subjected to pressure from the inside, support from inside is provided by the press-in cylinder 10.

In some embodiments, by limiting the central region by means of a free rotation diameter 22, the effect achieved is that pressing between press-in cylinder 10 and shaft 5 occurs substantially only in the region that is important for the torque transmission. In this way, unnecessary deformations or distorsions of the shaft 5 are avoided.

FIG. 4 shows a state before the toothing part 3 is pressed on, and FIG. 5 shows a state after the toothing part 3 has been pressed on and before the press-in cylinder 10 has been pressed in.

The invention claimed is:

1. An assembly (1) for connecting a toothing part (3) to a shaft (5) for conjoint rotation with the latter, comprising:
    wherein the toothing part (3) has a circular bore, and further comprises a bevel gear or a spur gear,
    a wherein the shaft (5) has:
        a cylindrical receiving portion (4) for receiving the toothing part (3), wherein the receiving portion has a smaller outside diameter than the shaft, and
        a cylindrical recess (8) in the shaft (5), which cylindrical recess (8) has a recess length that extends along an axis of the shaft (5) at least over an entire length of the receiving portion (4), and
    a press-in cylinder (10) which can be pressed into the recess (8) and which has an oversize in relation to the recess (8), wherein the press-in cylinder (10) has a constant outer diameter along the recess length.

2. The assembly (1) according to claim 1, wherein the wall thickness of the shaft (5) in the region of the receiving portion (4) is less than 15% of the external diameter of the receiving portion (4).

3. The assembly (1) according to claim 1, wherein an interference fit is present between the external diameter of the receiving portion (4) and the internal diameter of the bore of the toothing part (3).

4. The assembly (1) according to claim 1, wherein the press-in cylinder (10) comprises a bolt, and wherein an interference fit is present between the internal diameter of the recess (8) in the shaft (5) and the external diameter of the bolt.

5. The assembly (1) according to claim 1, wherein a connection that is free of form-fit engagement at least in the circumferential direction is present between the toothing part (3) and the receiving portion (4) and/or the shaft (5).

6. The assembly (1) according to claim 1, wherein a connection that is free of form-fit engagement at least in the circumferential direction is present between the press-in cylinder and the recess (8) of the shaft (5).

7. The assembly (1) according to claim 1, wherein the wall thickness of the shaft (5) in the region of the receiving portion (4) is at most 3 mm.

8. The assembly (1) according to claim 1, wherein the wall thickness of the shaft (5) in the region of the receiving portion (4) is greater than 3% of the external diameter of the receiving portion.

9. The assembly (1) according to claim 1, wherein the press-in cylinder is produced as a roller body of a roller bearing.

10. The assembly (1) according to claim 1, wherein the toothing part (3) is a bevel gear.

11. The assembly (1) according to claim 1, wherein the recess (8) has an internal contact region which extends axially at least over the length of the receiving portion (4) and, at least at one side of the internal contact region, is rotated freely with a free rotation diameter (22) which is greater than the diameter of the press-in cylinder (10).

12. An angular gear with an assembly according to claim 1, wherein the toothing part is a first bevel gear.

13. The angular gear according to claim 12, further comprising a second device according to claim 1, wherein a second bevel gear is provided as toothing part on a second shaft, and wherein the second bevel gear meshes with the first bevel gear.

14. The assembly (1) according to claim 1, wherein the press-in cylinder (10) is a solid structure.

15. The assembly (1) according to claim 1, wherein the shaft (5) is a hollow shaft defining a hollow interior having in inner diameter that is larger than the diameter of the recess, and wherein the press-in cylinder (10) extends through the recess (8) and into the hollow interior.

16. The assembly (1) according to claim 1, wherein the shaft has an outer diameter that is larger than the outer diameter of the receiving portion (4), and a shoulder defined between the outer diameter and the receiving portion (4).

17. The assembly (1) according to claim 1, further comprising a ridge (18) between the shoulder and the receiving portion (4).

18. The assembly (1) according to claim 1, wherein the press-in cylinder (10) has a constant outer diameter along an entire axial length of the recess (4).

19. A method for producing the assembly (1) according to claim 1, in which
   the toothing part (3) is pushed onto the receiving portion of the shaft (5), and
   the press-in cylinder is pressed into the recess (8) of the shaft.

20. The method according to claim 19, wherein the toothing part (3) is pushed onto the receiving portion (4) by pressing.

* * * * *